United States Patent
Liu et al.

(10) Patent No.: US 8,650,204 B2
(45) Date of Patent: Feb. 11, 2014

(54) TECHNIQUES FOR EFFICIENTLY SUPPORTING XQUERY UPDATE FACILITY IN SQL/XML

(75) Inventors: Zhen Hua Liu, San Mateo, CA (US); Hui Joe Chang, San Jose, CA (US); Balasubramanyam Sthanikam, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/330,622

(22) Filed: Dec. 19, 2011

(65) Prior Publication Data

US 2013/0159278 A1    Jun. 20, 2013

(51) Int. Cl.
*G06F 7/00*      (2006.01)
*G06F 17/30*    (2006.01)

(52) U.S. Cl.
USPC .......................................... 707/759; 707/769

(58) Field of Classification Search
USPC .......................... 707/713, 759, 769, 718, 719
See application file for complete search history.

(56) References Cited

U.S. PATENT DOCUMENTS

| | | | |
|---|---|---|---|
| 6,609,123 B1 | 8/2003 | Cazemier et al. | |
| 7,165,063 B2 | 1/2007 | Beyer et al. | |
| 7,756,858 B2 | 7/2010 | Lindblad et al. | |
| 7,840,547 B1 | 11/2010 | Tucker et al. | |
| 7,870,124 B2 | 1/2011 | Liu et al. | |
| 7,882,089 B1 | 2/2011 | Levy | |
| 7,921,129 B2 | 4/2011 | Madan et al. | |
| 8,161,035 B2 | 4/2012 | Zhang et al. | |
| 8,239,373 B2 | 8/2012 | Sthanikam et al. | |
| 8,301,620 B2 | 10/2012 | Sthanikam et al. | |
| 2003/0167258 A1 | 9/2003 | Koo et al. | |
| 2004/0148420 A1 | 7/2004 | Hinshaw et al. | |
| 2004/0205082 A1 | 10/2004 | Fontoura et al. | |
| 2005/0055355 A1* | 3/2005 | Murthy et al. | 707/100 |
| 2005/0097084 A1 | 5/2005 | Balmin et al. | |
| 2005/0108209 A1 | 5/2005 | Beyer et al. | |
| 2006/0026113 A1 | 2/2006 | Omoigui | |
| 2007/0011184 A1 | 1/2007 | Morris et al. | |
| 2007/0076936 A1 | 4/2007 | Li et al. | |
| 2007/0130110 A1 | 6/2007 | Graefe et al. | |

(Continued)

OTHER PUBLICATIONS

Hemel et al., "Code Generation by Model Transformation, A case Study in Transformation Modularity," Theory and Practice of Model Transformations Lecture Notes in Computer Science, 2008, vol. 5063/2008, pp. 183-198.

(Continued)

*Primary Examiner* — Robert Beausoliel, Jr.
*Assistant Examiner* — Hexing Liu
(74) *Attorney, Agent, or Firm* — Hickman Palermo Truong Becker Bingham Wong LLP

(57) ABSTRACT

The approaches described herein provide an efficient way to process certain kinds of queries that update XML data stored in an object-relational database. A query may include an XML query expression that conforms to a language for querying XML documents. A technique first determines whether the query contains an XML updating expression, and in response rewrites the query to comprise one or more path-based query operators that specify operations for updating XML data. The query may then be further rewritten to comprise one or more storage format specific query operators based on the particular database storage format associated with the XML data specified in the query. The rewritten query operators are used to generate a query execution plan that provides for several query execution optimizations.

16 Claims, 3 Drawing Sheets

(56) References Cited

U.S. PATENT DOCUMENTS

| | | |
|---|---|---|
| 2007/0162426 A1 | 7/2007 | Brown et al. |
| 2007/0168324 A1 | 7/2007 | Grabs et al. |
| 2007/0233645 A1 | 10/2007 | Peterson et al. |
| 2007/0276825 A1 | 11/2007 | Dettinger et al. |
| 2007/0276835 A1 | 11/2007 | Murthy |
| 2007/0299834 A1 | 12/2007 | Liu et al. |
| 2008/0065674 A1 | 3/2008 | Liu et al. |
| 2008/0114803 A1 | 5/2008 | Chinchwadkar et al. |
| 2008/0120283 A1 | 5/2008 | Liu et al. |
| 2008/0154868 A1* | 6/2008 | Ozcan et al. ............ 707/4 |
| 2008/0162442 A1* | 7/2008 | Agarwal et al. ............ 707/4 |
| 2008/0172353 A1 | 7/2008 | Lim et al. |
| 2008/0222101 A1 | 9/2008 | Beyer et al. |
| 2008/0222123 A1 | 9/2008 | Colby et al. |
| 2009/0070313 A1 | 3/2009 | Beyer et al. |
| 2009/0100004 A1 | 4/2009 | Andrei et al. |
| 2009/0125480 A1* | 5/2009 | Zhang et al. ............ 707/2 |
| 2009/0210383 A1 | 8/2009 | Seemann |
| 2009/0259641 A1 | 10/2009 | Balmin et al. |
| 2009/0287670 A1 | 11/2009 | Hou et al. |
| 2009/0327252 A1* | 12/2009 | Zhang et al. ............ 707/4 |
| 2010/0293199 A1* | 11/2010 | Sthanikam et al. ............ 707/796 |
| 2010/0299327 A1* | 11/2010 | Kiefer et al. ............ 707/736 |
| 2010/0306219 A1 | 12/2010 | Sthanikam et al. |
| 2010/0306220 A1* | 12/2010 | Sthanikam et al. ............ 707/759 |
| 2010/0312756 A1* | 12/2010 | Zhang et al. ............ 707/693 |

OTHER PUBLICATIONS

Zhang et al., "Honey, I Shrunk the XQuery!—An XML Algebra Optimization Approach," WIDM '02, Nov. 8, 2002, ACM, pp. 15-22.
U.S. Appl. No. 13/330,622, filed Dec. 19, 2011, Final Office Action, mailed May 22, 2013.
U.S. Appl. No. 12/474,124, filed May 28, 2009, Office Action, mailed Jun. 4, 2013.

* cited by examiner

TECHNIQUES FOR EFFICIENTLY SUPPORTING XQUERY UPDATE FACILITY IN SQL/XML

FIELD OF THE INVENTION

The techniques presented herein are directed towards storing XML data in a relational database, and updating the XML data in an efficient way.

BACKGROUND

XML Documents

XML (eXtensible Markup Language) is becoming increasingly popular as the format for describing and storing all forms of data. Thus, providing support for storing, searching, and updating XML documents is an extremely important problem for data management systems today.

Because of the popularity of XML as a data exchange format that supports hierarchical relationships among elements, and because of the power of relational data management systems (DBMS) to retrieve and update data, there is a demand for storing XML data into relational databases and retrieving and updating XML data from relational databases using native XML query constructs.

Querying XML Data Stored in an Object-Relational Database

When XML data is stored in an object-relational database, there are several choices about how the XML data is stored and how users express queries to retrieve and update the data. Users often find it convenient to use XQuery expressions to query XML data, relying on the database management system to translate the XQuery expressions into SQL statements that are optimized for the database system. XQuery 1.0 was developed by the XML Query working group of the W3C, and became a W3C recommendation in January 2007. XQuery provides SQL-like "FLWOR expressions" that support iteration and binding of variables to intermediate results of XML queries. A FLWOR expression is constructed from the five clauses after which it is named: FOR, LET, WHERE, ORDER BY, and RETURN. The translation by the database from XQuery to SQL and the optimization of the SQL depends on several factors including the nature of the XQuery expression and how the XML data is stored in the database.

Users may additionally use SQL/XML queries to query XML data stored in an object-relational database. A SQL/XML query is a query that includes one or more XML-aware query operators defined according to a SQL/XML standard, such as, for example, the SQL/XML standard defined in INCITS/ISO/IEC 9075-14:2008, the entire content of which is hereby incorporated by reference for all purposes as if fully set forth herein. Although examples and embodiments shown hereinafter primarily refer to using SQL, SQL/XML, and XQuery, it is understood the techniques described in the present application are not limited to use with SQL, SQL/XML, and XQuery, and can be implemented with other compatible database languages.

XPath Expressions

XPath is a language for addressing XML documents that operates on the abstract, logical structure of an XML document, rather than its surface syntax. XPath gets its name from its use of a path notation, as in URLs, for navigating through the hierarchical structure of an XML document. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression. XPath expressions are described in Section 3 ("Expressions") of "XML Path Language (XPath)" (version 1.0). One important kind of expression is a location path which indicates a set of nodes relative to a context node. The semantics of location paths are described in Section 2 ("Location Paths") of "XML Path Language (XPath)" (version 1.0).

XPath is a subset of XQuery. That is, an XPath expression is also an XQuery expression. However, XQuery also has programming constructs in addition to XPath expressions.

Updating XML Data

While retrieving XML data from a database is useful, users often desire the ability to update portions of the XML data. The ability to update XML data may be desired, for example, in order to add additional nodes containing new data to the existing XML data, to delete existing nodes from the XML data, or to modify the values contained in the existing nodes.

The XQuery Update Facility is an extension of the XQuery language that provides expressions that can be used to make persistent changes to instances of the XQuery and XPath data models. The XQuery Update Facility is described in detail in "XQuery Update Facility" (version 1.0), a W3C (World Wide Web Consortium) Recommendation dated 17 Mar. 2011.

The XQuery Update Facility has become the recommended way of updating XML by the W3C XQuery Working Group. The XQuery Update Facility defines several new kinds of XQuery expressions for updating XML data including expressions to insert, delete, replace, and rename nodes contained in XML data.

The SQL/XML standard has defined the use of the XQuery Update Facility as a way of updating XML data stored in an object-relational database. The SQL/XML standard defines the use of certain SQL operators in conjunction with XQuery Update Facility expressions to semantically update XML data stored in an object-relational database.

However, if a database server implemented the XQuery Update Facility following the conceptual XML updating process as defined by the SQL/XML and XQuery Update Facility standards, database performance of XML data updates would not be optimal. The conceptual process of updating XML as defined by the SQL/XML and XQuery standards is referred to herein as the functional evaluation of XML updating expressions. In order to improve the functional evaluation of database queries that update XML data stored in a database, compile-time and run-time optimization techniques are introduced to optimize execution of the queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompany drawings and in which like reference numerals refer to similar elements and in which.

DETAILED DESCRIPTION

Figure 1:
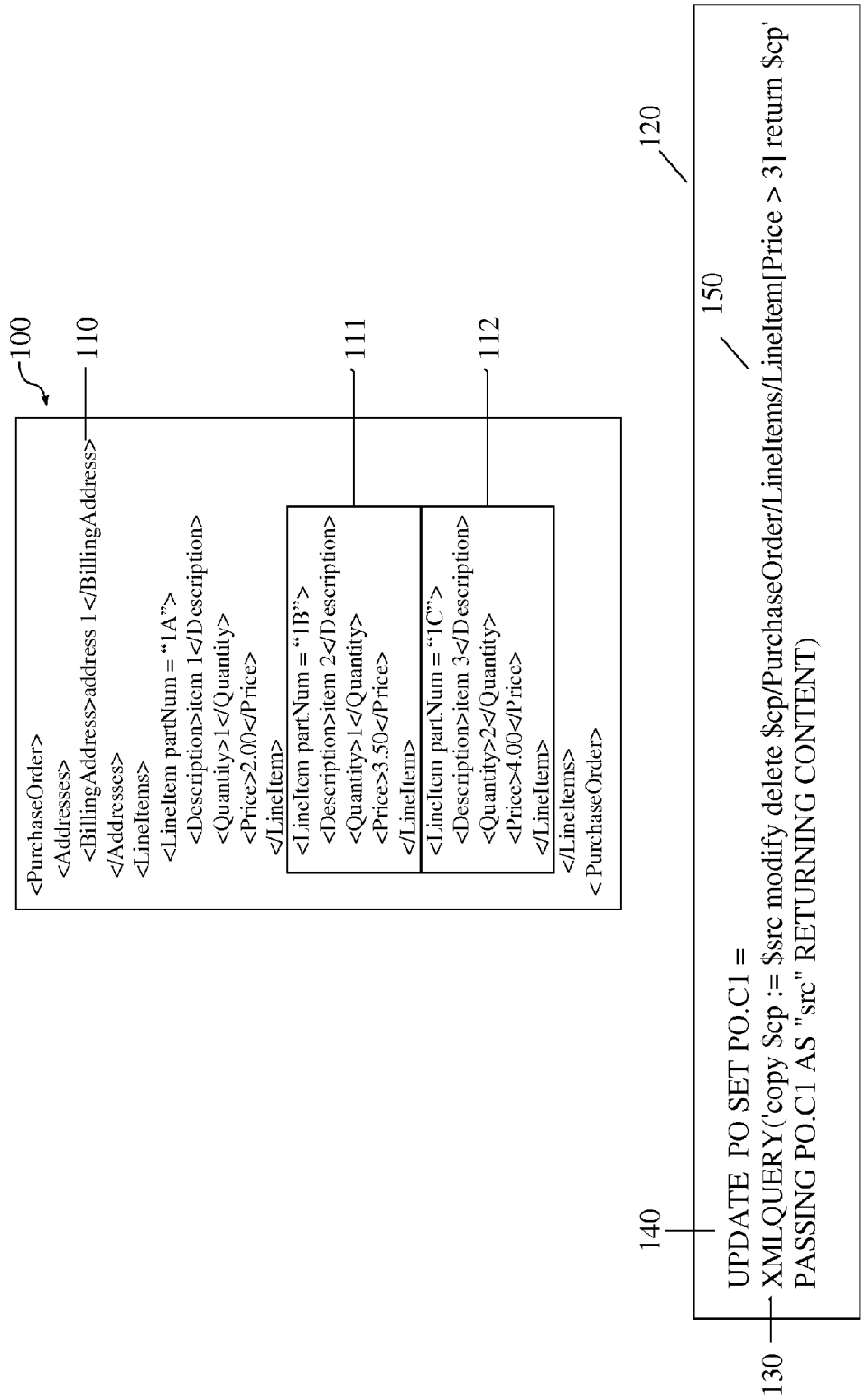
FIG. 1 is an example XML document and an example query that updates XML data contained in the XML document.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The approaches described herein provide an efficient way for a database server to process certain kinds of queries that update XML data stored in an object-relational database. A query that updates XML data is one that contains an XML updating expression that conforms to a language for updating XML documents. Execution of an XML updating expression modifies the state of one or more nodes of one or more XML documents. Examples of XML updating expressions include expressions that insert, delete, rename, and replace nodes contained in XML data.

A database server may use these techniques to identify a query that contains an XML updating expression and if so, to re-write the query to produce an optimized query execution plan. The query may be rewritten to comprise one or more path-based query operators that specify operations for updating XML documents stored in a database. The path-based query operators may be further rewritten into storage format specific query operators based on the particular storage format used to store the XML documents against which the query is applied.

XML Storage

Various types of storage mechanisms are used to store an XML document. In addition, each storage mechanism may use one or more various storage formats to store an XML document. One type of storage mechanism stores an XML document as a text file in a file system. Another type of mechanism for storing XML documents is a database server. In a database server, according to one storage format an XML document may be stored in a row of a table and nodes of the XML document are stored in separate columns in the rows and/or are stored in other underlying nested tables. According to another storage format, an entire XML document may also be stored in a lob (large object) in a column. An XML document may also be stored as a hierarchy of objects in a database; each object is an instance of an object class and stores one or more elements of an XML document. Tables and/or objects of a database system that hold XML data are referred to herein as base tables or objects.

Binary-encoded XML is another storage format in which XML data may be stored in a database. Binary-encoded XML is a compact binary representation of XML that was designed to reduce the size of XML documents. One of the ways binary-encoded XML compresses data is by representing strings ("tokens") with fixed values.

In one implementation of binary-encoded XML, a mapping is established between character strings and replacement values, where the character strings are tag names, and the replacement values are numbers. Such mappings are referred to herein as "translation information".

Database servers that store XML data may include many mechanisms that allow for powerful and efficient ways to query large collections of XML documents. Database servers that store XML documents may be enhanced to efficiently perform XML operations using these mechanisms. A database server may maintain an XML index, that indexes a collection of XML. An XML index contains multiple structures that are cooperatively used to access a collection XML documents. According to an embodiment of the present invention, an XML index includes a path table or a set of index content tables, which contains information about the hierarchies of nodes in a collection XML documents and may contain the value of the nodes.

Functional Evaluation of XQuery Update Facility Expressions

FIG. 1 shows an example SQL/XML query 120 that conforms to the SQL/XML standard for updating XML data in a database. The query operates on the XML document 100. The XML document 100 is stored as binary-encoded XML in a column of a table of an object-relational database. Document 100 contains XML-formatted data that describes a purchase order, and records a number of line items associated with the purchase order. Each line item contains several nodes containing additional information about the line item including the product name, quantity, and price.

The SQL/XML query 120 contains an SQL UPDATE statement 140 that assigns the value returned by the XML-aware query operator 130 to the "PO.C1" column specified on the left-hand side of the equals sign. The assignment is carried out by the database as a whole value replacement, meaning the entire contents of the value in the "PO.C1" column are overwritten by the value returned by the XML-aware query operator 130.

The value returned by the XML-aware query operator 130 is determined based on the XQuery expression 150. The XQuery expression 150 conforms to the syntax for a transform expression as defined by the XQuery Update Facility. A transform expression in XQuery creates modified copies of existing nodes contained in an instance of XML data that is specified as an input parameter to the transform expression. The value returned by a transform expression is an XML data instance that may include both nodes that were created by the transform expression and other, previously existing nodes.

An XQuery transform expression consists of three clauses, denoted by the keywords copy, modify, and return. The copy clause in XQuery expression 150 contains a "source expression" "$src" that is bound to the variable "$cp". According to the semantics of the XQuery Update Facility, the result of evaluating the source expression must be a single node in an XML document. In XQuery expression 150, the source expression "$src" corresponds to the root node of XML document 100 stored in the "PO.C1" column in the "PO" database table. The result of evaluating the source clause in XQuery expression 150 specifies that a copy of the XML data corresponding to the root node of XML document 100 is bound to the variable "$cp".

The modify clause of a transform expression contains an XQuery updating expression specifying a modification to be performed to the XML data identified in the source expression. In XQuery expression 150, the modify clause contains a "delete" updating expression specifying that all nodes satisfying the XPath expression "$cp/PurchaseOrder/LineItems/LineItem[Price>3]" should be deleted. In the example XML data contained in XML document 100, nodes 111 and 112 would be deleted because each node contains a "<Price>" node with a node value greater than 3.

The return clause of a transform expression specifies an XQuery expression that identifies a selection of the modified data from the modify clause and the evaluation of which determines the result returned by the transform expression. In the example XQuery expression 150, the return clause returns the entire XML data bound to the variable "$cp" as modified by the delete expression, corresponding to the XML data in document 100 with nodes 111 and 112 deleted. The SQL UPDATE operator then replaces the current value in the "PO.C1" column with the value returned by the XMLQUERY operator.

The preceding example describes the functional evaluation process of an XML data update as defined by the SQL/XML and XQuery Update Facility standards. Thus, the functional evaluation process for updating XML data in a database according to the SQL/XML and XQuery Update Facility standards semantically requires that a database server copy the XML document from the specified base table column, materialize the entire XML representation of the data in the document, update the materialized XML data representation according to the XQuery transform expression, and then replace the base table column value with the modified copy of the XML data.

A query updating XML data contained in an XML document may often update only a small portion of the XML data relative to the size of the document stored in the database column as a whole, resulting in a great deal of overhead for a database server implementing the functional evaluation process requiring a copy of the input data to be made and whole value replacement of the result. Because the database is required to make a copy of the entire XML input data, this means that the database also must materialize the XML Document Object Model (DOM) for the entire document in order to perform the update operations. Additionally, if the data is stored in the database as binary-encoded XML, in order to materialize the input XML data the database server must decode the binary-encoded XML input, update the decoded XML data, re-encode the updated XML data, and replace the entire re-encoded XML data in the database column. Database performance of XML data updates would be greatly enhanced if the database server evaluation of XML data updates could be optimized to update the XML data directly in database storage and avoid the functional evaluation steps of copying the input data and the whole value replacement of the modified data.

Query Rewrite and Optimization

When a database server receives a query containing an XQuery expression, the database system performs a series of steps of translation, rewriting, and optimization before executing the query. Each step of the query transformation may result in a re-formed representation of the query. Alternatively, the database system may represent the transformed query as in-memory data structures at one or more steps of query transformation.

The next sections describe query transformations that are relevant to the techniques described herein.

XQuery to SQL Translation

A query containing an XQuery expression is rewritten in terms of XML-aware SQL constructs before the expression can be computed. Relational databases operate on rows and columns, and thus, XQuery expressions are translated into SQL operations that can operate on XML data and update rows comprising columns of XMLType data.

Figure 2:
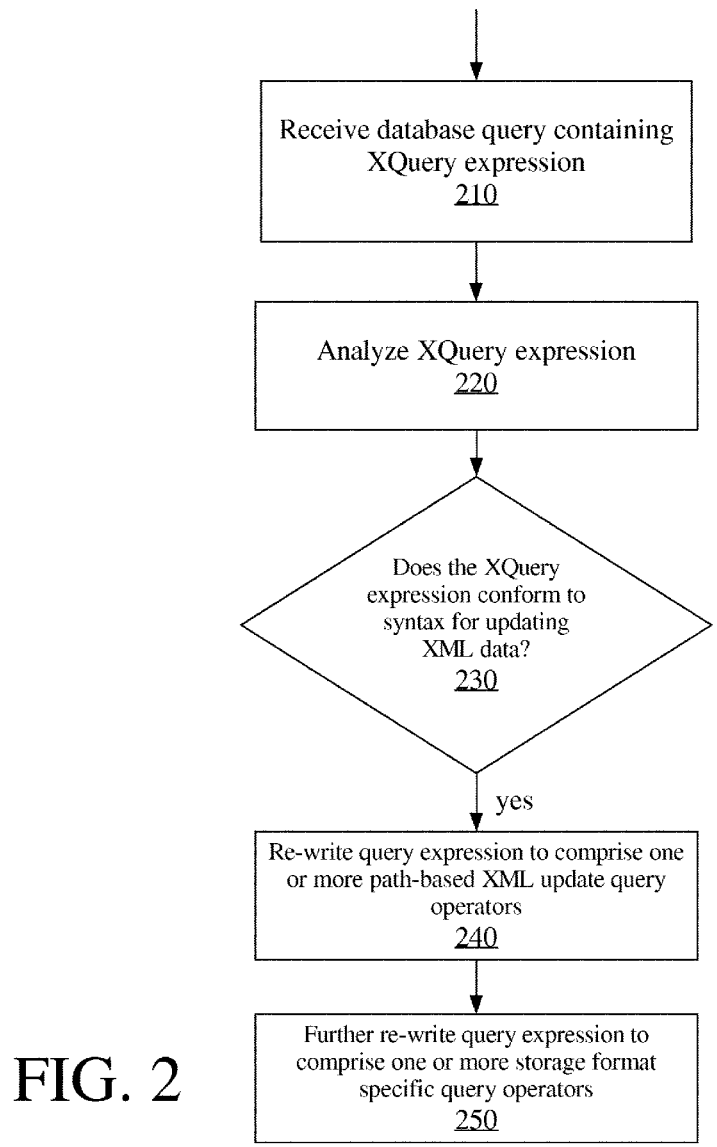
FIG. 2 is a flow diagram showing the analysis of a query containing an XQuery updating expression to determine whether to re-write the query.

FIG. 2 is a flow diagram that illustrates the process of a database server receiving and rewriting a query that contains an XQuery updating expression. The following is an example of a SQL/XML query containing an XQuery expression for inserting a node into the XML data contained in XML document 100 that may be rewritten according to the flow diagram:

```
UPDATE PO SET PO.C1 =
XMLQUERY('copy $cp := $src modify insert
    <ShippingAddress>address2</ShippingAddress> before
    $cp/PurchaseOrder/Addresses/BillingAddress return $cp PASSING
    PO.C1 as "src" RETURNING CONTENT)
```

In step 210, a database server receives a query containing an XQuery expression, such as the example above. The XQuery expression is analyzed in step 220. As a result of the analysis, a determination is made in step 230 regarding whether the XQuery expression conforms to a syntax for updating XML data. The syntax may, for example, be the syntax for updating XML as specified by the XQuery Update Facility standard.

In step 240, the query containing an XQuery updating expression is re-written to comprise one or more XML-aware, but storage format-unaware, query operators that specify operations for updating XML data, for example, the XQInsertNodes query operator used by Oracle in the case of an insert updating expression. A storage format-unaware query operator is a logical query operator that corresponds to the functionality of a particular XQuery update function but is independent of the particular storage format storing the XML data specified in the query. The query is re-written to comprise a particular storage format-unaware query operator based on the type of XQuery updating expression contained in the query and the same query operator may be used for a particular updating expression regardless of the underlying storage format of the XML data.

In an embodiment, the specified XML update operation will be performed relative to one or more nodes satisfying a target XPath expression that is a parameter to the storage format-unaware query operator. For example, in the case of the insert operator in the example above, the target XPath expression "$cp/PurchaseOrder/Addresses/BillingAddress" identifies the "BillingAddress" node 110 in FIG. 1 that the specified "ShippingAddress" node will be inserted immediately after or before in the XML data, depending on an additional parameter to the query operator.

Using the example SQL/XML query above, an XML-aware query operator for inserting nodes is re-written at XQuery rewrite time. Here is a simplified example of XML-aware SQL generated for the example SQL/XML query above using the storage format-unaware query operator XQInsertNodes:

```
XQInsertNodes(PO.C1, '/PurchaseOrder/Addresses/BillingAddress',
<ShippingAddress>address 2</ShippingAddress>, before,
multi-node-not-OK)
```

The XQInsertNodes query operator above specifies the target XPath expression of "/PurchaseOrder/Addresses/BillingAddress" to identify the target node "<BillingAddress>", corresponding to the path expression identifying the same node in the original SQL/XML query. The query operator further specifies that a new "<ShippingAddress>" node is to be inserted before the target node. In an embodiment, the re-written storage format-unaware query operator corresponds to the particular type of update operation to be performed, but is independent of the particular type of storage format storing the XML data in the database.

SQL Query Rewrite

Once a query containing an XQuery updating expression is re-written in terms of XML-aware SQL constructs, a database server optimizes the query and generates an execution plan. In one embodiment, optimization may be based on the XML data that the XQuery update expression references and the particular data storage format storing the referenced XML data in the database.

The outcome of query optimization is a query execution plan. The query execution plan provides the instructions to the database SQL engine as to the sequence of function calls and their parameters. For example, the query operators described above will be used in the construction of the query execution plan to parameterize a function that the SQL engine will invoke at run time. In an embodiment, depending on the particular type of storage format storing the XML data, a storage format specific query operator can be invoked to perform run-time optimization. In step 250, the query is further re-written to comprise one or more storage format specific query operators based on the particular database storage format storing the collection of XML documents identified in the query.

A storage format specific query operator is a function which, when invoked by the SQL engine, operates on XML data in a manner specific to the underlying storage format storing the XML data. In one embodiment, the data storage format storing the XML data identified in the query is binary-encoded XML. In the case of binary-encoded XML, the query may be further rewritten to comprise one or more storage format specific query operators enabled to perform streaming evaluation of binary-encoded XML. The streaming evaluation of binary-encoded XML represents an example of an optimized data storage format access mechanism particular to a data storage format that is represented by the storage format specific query operator. A description of streaming evaluation of binary-encoded XML is contained in patent application Ser. No. 11/938,017, filed Nov. 9, 2007, entitled "*Optimized Streaming Evaluation of XML Queries*," the contents of which are incorporated by reference herein. In an embodiment, a database may use streaming evaluation to decode and re-encode only the portions of the XML document required to perform the specified update operations rather than materializing the entire binary-encoded XML document.

In another embodiment, the data storage format in which the XML data may be stored is an object-relational storage format based on the hierarchy of objects in each XML document stored in the database. In the case of object-relational storage of XML data based on a hierarchy of objects, in one embodiment the storage format specific query operator may be enabled to perform updates directly to the underlying object-relational tables storing the XML data. In another embodiment, the database server updates only those tables containing XML objects specified to be updated in the query. Because the storage format specific query operator may be enabled to perform updates directly to the underlying object-relational tables, the database is not required to make a copy of the input XML data and the XML data does not need to be materialized prior to performing the update operations.

Multiple Target Node Updates

In the previous embodiments, the modify clause of the XQuery updating expression identified the nodes targeted by the update operation based on a single target XPath expression. In another embodiment, the target expression may not be a single path expression, but instead may be an XQuery FLWOR expression containing a looping construct that identifies multiple target update nodes. The XQuery Update Facility semantics require that the result of evaluating the target node expression of a transform expression must be a single node from the input XML data. Thus, if a user desires to perform an XML data update relative to multiple nodes using a single SQL/XML statement, the XQuery Update Facility semantics require that the XQuery expression iterate over the multiple target nodes using a FLWOR looping construct.

In one embodiment, upon identifying a query that contains an XQuery updating expression that contains a FLWOR expression, the query may be rewritten to comprise an XML-aware query operator that contains a path expression that identifies the multiple target update nodes identified in the FLWOR expression.

According to the XQuery Update Facility standard, a target node path expression in an updating expression that either identifies more than one node or references a node that does not exist in the XML data results in the return of an error. In another embodiment, the XML-aware query operator may be configured to either return an error or not when the target node path expression of the updating expression either references a node that does not exist or identifies more than one node in the input XML data. In an embodiment, the configuration is supplied as an additional parameter to the XML-aware query operator. For example, the parameter "multi-node-not-OK" in the query operator above is one way of indicating that an error should be returned if the target node path expression identifies more than one node in the XML data.

Sequence Expressions

In the embodiments described above, the modify clause of the XQuery expression specified a single XQuery updating expression. According to the XQuery standard, the modify clause may contain multiple updating expressions using an XQuery sequence expression. A sequence expression combines multiple XQuery expressions into a single result sequence. For example, the XQuery sequence expression "(replace value of $Price/LastTrade with 30, replace value of $Price/Ask with 30*1.1)" combines the updating expression "replace value of $Price/LastTrade with 30" with the updating expression "replace value of $Price/Ask with 30*1.1". Sequence expressions are used to combine multiple updating expressions into a single modify clause. Thus, the XQuery expression "copy $cp:=$src modify let $price:=$src/Security/Price return (replace value of $price/LastTrade with 30, replace value of $price/Ask with 30*1.1) return $cp" modifies both the "LastTrade" and "Ask" nodes specified by the path "$/src/Security/Price" in a single XQuery modify clause.

In one embodiment, a query containing an XQuery updating expression that contains a sequence expression is rewritten into a single XML-aware query operator containing multiple target node path expressions. For example, a query containing the sequence expression above may be rewritten into the query operator "XQUpdateNodesVal(PO.C1, '/Security/Price/LastTrade', 30, '/Security/Price/Ask', 30*1.1)".

Conditional Expressions

In another embodiment, a query containing an XQuery updating expression may include a conditional expression controlling whether the specified update operation will be performed based on the evaluation of a condition in the conditional expression. For example, an XQuery transform expression may specify: "copy $cp:=$src modify if (count ($cp/PurchaseOrder/LineItems/LineItem)>4) then delete node $cp/PurchaseOrder/LineItems/LineItem[Price>3] else ( ) return $cp". The expression specifies that if the number of nodes satisfying the path expression "$cp/PurchaseOrder/LineItems/LineItem" is greater than 4, then delete the nodes satisfying the path expression "$cp/PurchaseOrder/LineItems/LineItem[Price>3]". However, the condition of an XQuery conditional expression may not always evaluate to true, in which case the database need not evaluate the part of the transform expression performing the XML data update.

In one embodiment, upon identifying a query that contains an XQuery updating expression, the evaluation of which is dependent upon an XQuery conditional expression, the query may be rewritten to comprise a SQL conditional operator that avoids performing any XML data updates if the specified condition does not evaluate to true. For example, a query containing the conditional expression above may be rewritten as follows:

```
CASE WHEN (SELECT COUNT(v) FROM TABLE(XQSEQ(PO.C1,
'/PurchaseOrder/LineItems/LineItem')) > 4
THEN XQDeleteNodes(PO.C1,
'/PurchaseOrder/LineItems/LineItem[Price > 3]')
ELSE UPDATE_NO_OP
```

The rewritten query will first determine whether the number of nodes specified by the first path expression "$cp/PurchaseOrder/LineItems/LineItem" is greater than 4 using a SQL CASE conditional expression, and only if the conditional expression evaluates to true will the database server evaluate the query operator that deletes the nodes based on the second path expression "/PurchaseOrder/LineItems/LineItem [Price>3]".

XML Index Optimization

In one embodiment, XML data is stored in a database in aggregate form. In aggregate storage, XML data is stored in the database in large objects (LOBs), which include character-type large objects (CLOBs) and binary-type large objects (BLOBs). To simplify certain queries on XML data stored in aggregate form, a structured XML index may be defined to selectively store, in object-relational tables, extracted portions of XML data stored in LOBs. A structured XML index is an index that stores XML data in object-relational tables. The XML elements stored in a structured XML index may be tied to the LOB storing the source XML document through a location identifier for the XML table storing the LOB. Such a location identifier may be a physical row identifier, or a logical identifier of the location of the LOB in the base table, etc.

An example of a structured XML index is the XMLIndex developed by Oracle Corporation, as described in U.S. Pat. No. 6,427,123, issued Jul. 30, 2002 entitled "*Hierarchical Indexing For Accessing Hierarchically Organized Information In A Relational System*," the contents of which are incorporated by reference as if fully set forth herein. While a structured XML index is described here in connection with XML data stored in aggregate form, a structured XML index may be used with many different kinds of data.

A query containing an XQuery updating expression may update portions of XML data that are indexed by an XML index, requiring that the XML index be updated in order to reflect the changes to the indexed XML data. In one embodiment, a determination is made whether a query containing an XQuery updating expression identifies target XML nodes that are a subset of the nodes indexed by an XML index. If there is no overlap between the identified target XML nodes and the nodes indexed in the XML index, then a flag is set indicating that the XML index does not need to be updated. This determination helps avoids the run-time overhead of maintaining the XML index when the updates to the XML data do not affect the XML index.

In another embodiment, a query may contain an XQuery "collection" function. An XQuery collection function takes as a single argument a Uniform Resource Indicator (URI) corresponding to a location containing XML data. The XQuery collection function returns a data model representation of the data contained at the location specified by the URI parameter. In one embodiment, if an XML index exists that indexes the data specified by the URI parameter to the collection function contained in a query, then the query may be rewritten to comprise one or more index-based query operators. An index-based query operator includes syntax that identifies an XML index that indexes XML data specified in the query. The database server may then use the identified index to more efficiently perform the update operation specified in the query Database Systems A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database.

Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
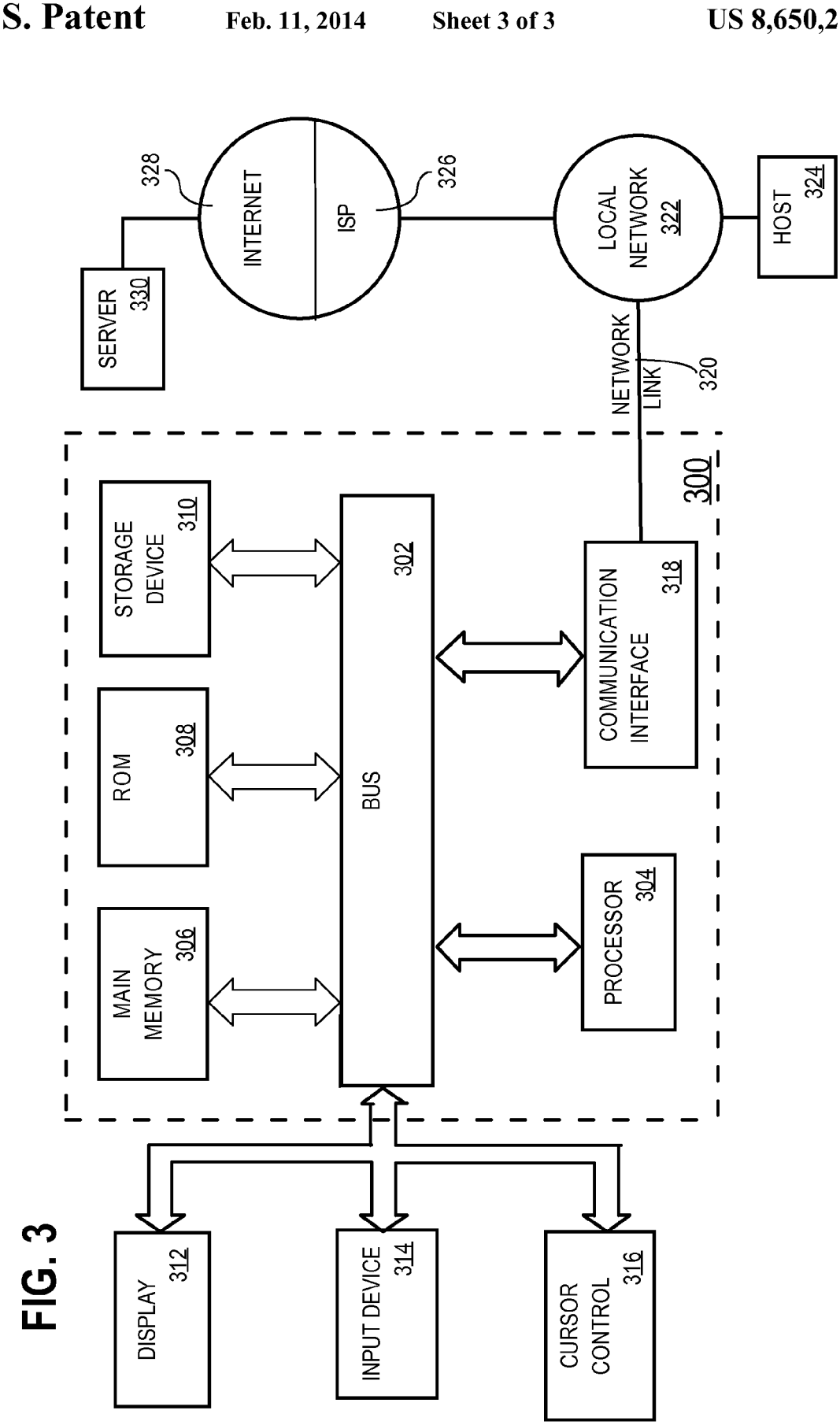
FIG. 3 is a block diagram that illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a query expression against a collection of XML documents stored in one or more database tables, wherein the collection of XML documents are stored based on a particular data storage format;
determining that the query expression contains an updating expression that conforms to a language for querying XML documents, the updating expression specifying a particular operation for updating XML data;
in response to determining that the query expression contains the updating expression that conforms to the language for querying XML documents, rewriting the query expression to form a first rewritten query expression comprising one or more path-based query operators, wherein the one or more path-based query operators are selected based on the particular operation for updating XML data specified by the updating expression;
based on the particular data storage format storing the collection of XML documents, rewriting the first rewritten query expression to form a second rewritten query expression comprising one or more storage format specific query operators configured to update particular XML data of the collection of XML documents; and
wherein the method is performed by one or more computing devices.

2. The method of claim 1, wherein the particular data storage format is binary-encoded XML, and wherein at least one of the one or more storage format specific query operators is configured to perform streaming evaluation of binary-encoded XML.

3. The method of claim 1, wherein the particular data storage format is relational storage, and wherein at least one of the one or more storage format specific query operators is configured to perform a SQL update against one or more of the one or more database tables.

4. The method of claim 1,
wherein at least one of the one or more path-based query operators of the first rewritten query expression includes a path expression that identifies two or more target update nodes.

5. The method of claim 1,
wherein at least one of the one or more path-based query operators of the first rewritten query expression includes two or more path expressions based on a sequence expression identified in the updating expression.

6. The method of claim 1,
wherein the first rewritten query expression further comprises a SQL conditional statement based on a conditional expression identified in the updating expression.

7. The method of claim 1, further comprising:
determining that the updating expression specifies an update of XML data that is not indexed by a particular XML index;
in response to determining that the updating expression specifies the update of XML data that is not indexed by the particular XML index, setting a flag indicating that the particular XML index should not be updated.

8. The method of claim 1,
wherein the first rewritten query expression further comprises one or more index-based query operators, wherein the index-based query operators identify an XML index.

9. A non-transitory computer-readable medium storing instructions which, when executed by one or more processors, cause the one or more processors to perform a method, comprising:
receiving a query expression against a collection of XML documents stored in one or more database tables, wherein the collection of XML documents are stored based on a particular data storage format;
determining that the query expression contains an updating expression that conforms to a language for querying XML documents, the updating expression specifying particular operation for updating XML data;
in response to determining that the query expression contains the updating expression that conforms to the language for querying XML documents, rewriting the query expression to form a first rewritten query expression comprising one or more path-based query operators, wherein the one or more path-based query operators are selected based on the particular operation for updating XML data specified by the updating expression;
based on the particular data storage format storing the collection of XML documents, rewriting the first rewritten query expression to form a second rewritten query expression comprising one or more storage format specific query operators configured to update particular XML data of the collection of XML documents.

10. The non-transitory computer-readable medium of claim 9, wherein the particular data storage format is binary-encoded XML, and wherein at least one of the one or more storage format specific query operators is configured to perform streaming evaluation of binary-encoded XML.

11. The non-transitory computer-readable medium of claim 9, wherein the particular data storage format is relational storage, and wherein at least one of the one or more storage format specific query operators is configured to perform a SQL update against one or more of the one or more database tables.

12. The non-transitory computer-readable medium of claim 9,
wherein at least one of the one or more path-based query operators of the first rewritten query expression includes a path expression that identifies two or more target update nodes.

13. The non-transitory computer-readable medium of claim 9,
wherein at least one of the one or more path-based query operators of the first rewritten query expression includes two or more path expressions based on a sequence expression identified in the updating expression.

14. The non-transitory computer-readable medium of claim 9,
wherein the first rewritten query expression further comprises a SQL conditional statement based on a conditional expression identified in the updating expression.

15. The non-transitory computer-readable medium of claim 9, further comprising:
determining that the updating expression specifies an update of XML data that is not indexed by a particular XML index;
in response to determining that the updating expression specifies the update of XML data that is not indexed by the particular XML index, setting a flag indicating that the particular XML index should not be updated.

16. The non-transitory computer-readable medium of claim 9,
wherein the first rewritten query expression further comprises one or more index-based query operators, wherein the index-based query operators identify an XML index.

* * * * *

UNITED STATES PATENT AND TRADEMARK OFFICE
CERTIFICATE OF CORRECTION

PATENT NO. : 8,650,204 B2  
APPLICATION NO. : 13/330622  
DATED : February 11, 2014  
INVENTOR(S) : Liu et al.

Page 1 of 1

It is certified that error appears in the above-identified patent and that said Letters Patent is hereby corrected as shown below:

In the Claims

In column 14, line 55, in Claim 9, delete "specifying" and insert-- specifying a --, therefor.

Signed and Sealed this
First Day of July, 2014

Michelle K. Lee
*Deputy Director of the United States Patent and Trademark Office*